United States Patent [19]
Kadambi et al.

[11] Patent Number: 5,812,554
[45] Date of Patent: Sep. 22, 1998

[54] EFFICIENCY OF A NETWORK HAVING A MINIMUM DATA TRANSMISSION TIME

[75] Inventors: Jayant Kadambi, Milpitas; Mohan Kalkunte, Sunnyvale; Jim Mangin, San Ramon, all of Calif.

[73] Assignee: Advanced Micro Devices, Inc., Sunnyvale, Calif.

[21] Appl. No.: 654,406

[22] Filed: May 28, 1996

[51] Int. Cl.[6] .................................................. H04J 3/24
[52] U.S. Cl. ........................ 370/473; 370/389; 370/471
[58] Field of Search ................................. 370/389, 394, 370/445, 446, 462, 465, 471, 473, 505, 506, 510; 364/514

[56] References Cited

U.S. PATENT DOCUMENTS

| | | | |
|---|---|---|---|
| 4,954,965 | 9/1990 | Johnson et al. | 364/514 |
| 5,048,009 | 9/1991 | Conrad | 370/445 |
| 5,555,244 | 9/1996 | Gupta et al. | 370/462 |
| 5,673,254 | 9/1997 | Crayford | 370/446 |

OTHER PUBLICATIONS

"Carrier Extension Issues" Author: Stephen Haddock; Dated May 21, 1996.

P. Gburzynski and Z. Y. Zhou, "Ethernet for Short Packets," *International Journal of Modeling and Simulation*, vol. 13, No. 2, 1993, pp. 62–66.

*Primary Examiner*—Douglas W. Olms
*Assistant Examiner*—Shick Hom
*Attorney, Agent, or Firm*—Fliesler, Dubb, Meyer & Lovejoy

[57] ABSTRACT

Efficient communication in a network having a minimum data transmission time interval wherein a data packet is transmitted beginning at a start of the minimum data transmission time interval. An end of the minimum data transmission time interval is determined and then at least one next data packet is transmitted after the data packet if the end of the minimum data transmission time is after the end of the data packet.

61 Claims, 6 Drawing Sheets

EFFICIENCY OF A NETWORK HAVING A MINIMUM DATA TRANSMISSION TIME

BACKGROUND OF THE INVENTION

1. Field of Invention

The present invention pertains to the field of networks. More particularly, this invention relates to a method for improving the efficiency of a network.

2. Art Background

Communication networks such as local area networks are commonly employed in a wide variety of computer related applications. For example, local area networks commonly provide communication among groups of personal computer systems as well as engineering work stations and mainframe systems. In addition, local area networks commonly provide sharing of a variety of peripheral devices.

In a typical local area network, the individual computer systems and peripheral devices are coupled to a common transmission medium which may include coaxial transmission lines or other types of transmission lines. Each individual computer system and peripheral device coupled to the transmission medium may be referred to as a communication node on the network.

Some networks implement a communication protocol that enables the individual communication nodes to independently initiate data transmissions as required. Such a communication protocol usually includes collision detection schemes that enable error recovery should multiple communication nodes undertake overlapping data transmissions. One type of prior communication network that implements such a communication protocol with collision detection is referred to as an Ethernet communication network or a CSMA/CD communication network.

Each individual communication node of such a communication network typically monitors the transmission medium for possible data transmissions underway before initiating an outgoing data transmission. If another data transmission is not detected, then the communication node usually initiates the outgoing data transmission. Thereafter, if a collision occurs on the transmission medium then each transmitting communication node aborts transmission and schedules a re-transmission according to a predetermined backoff algorithm.

The protocols that govern such communication networks typically impose a minimum time interval for data transmissions. For example, the IEEE 802.3 standard for Ethernet networks defines a minimum slot time interval for data transmission equal to 512 bit times. Such a minimum data transmission time interval is typically selected to ensure that all communication nodes coupled to the transmission medium are able to detect collisions in view of the round trip propagation delay across the diameter of the network.

Figure 7A:
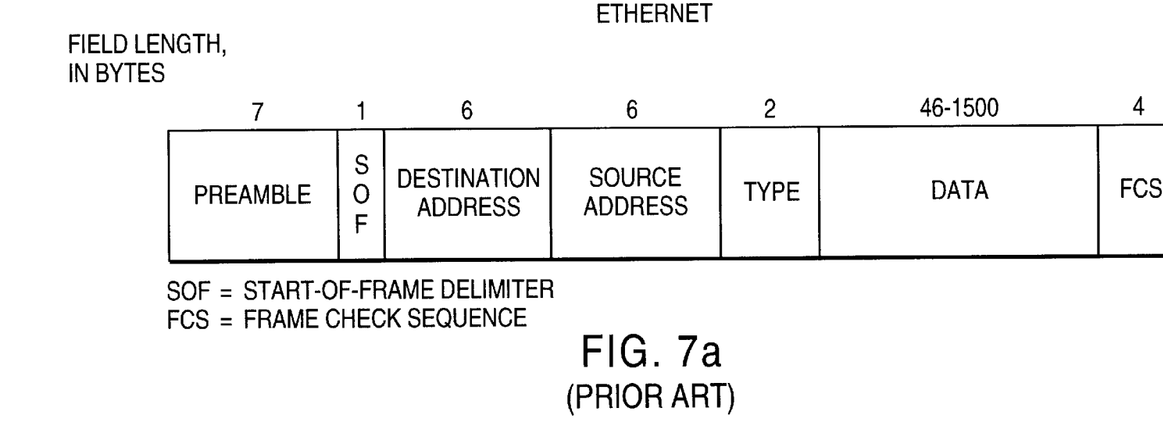
FIGS. 7a and 7b illustrate data formats for conventional Ethernet and IEEE 802.3 data packets, respectively.
Figure 7B:
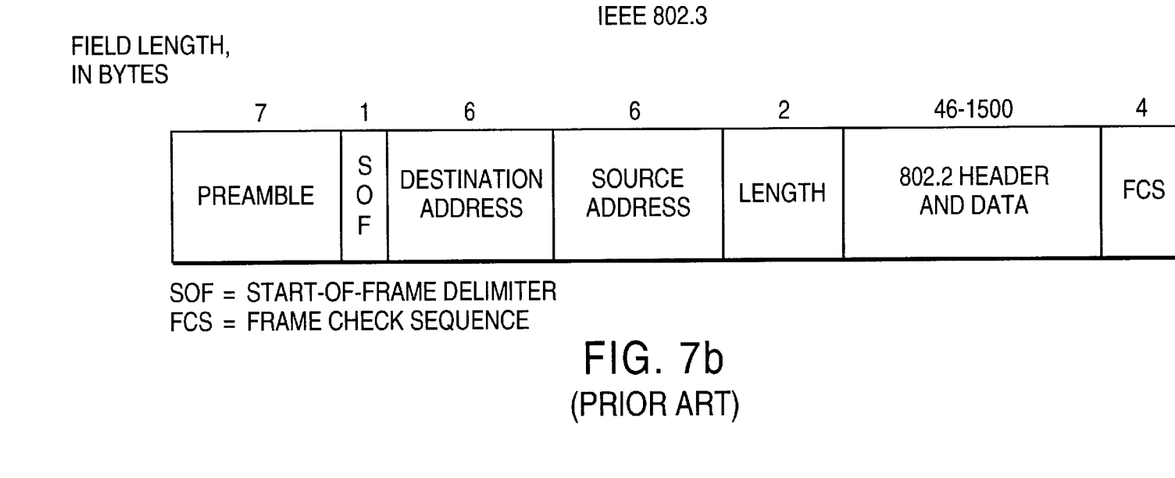

Conventional data formats for Ethernet and IEEE 802.3 packets are illustrated in FIGS. 7a and 7b, respectively. As shown in FIG. 7a, a conventional Ethernet data packet includes the following fields in sequence: a Preamble, a Start-Of-Frame (SOF) delimiter, a Destination Address, a Source Address, a Type, Data, and a Frame Check Sequence (FCS). As shown in FIG. 7b, a conventional IEEE 802.3 packet includes the following fields in sequence: a Preamble, a Start-Of-Frame (SOF) delimiter, a Destination Address, a Source Address, a Length, Data, and a Frame Check Sequence (FCS). The IEEE 802.3 data packet has essentially the same data format as that of the Ethernet data packet except for some subtle differences. One difference is that the Type field in the Ethernet data packet is replaced by the Length field in the IEEE 802.3 data packet.

Typically, such a minimum data transmission time interval imposes a maximum physical diameter of the network for a given data transmission speed. An Ethernet network, for example, that supports a 10 megabits per second data transmission rate is limited by the 512 bit minimum slot time interval to a maximum diameter of approximately 2 kilometers. An Ethernet network having a data transmission rate of 100 megabits per second is restricted to a diameter of approximately 200 meters by the minimum slot time interval of 512 bits.

As a consequence, protocols that govern higher bandwidth networks such as gigabit Ethernet networks may increase the minimum slot time in order to yield a practical maximum network diameter. For example, an Ethernet communication network having a data transmission rate of 1000 megabits per second and a minimum slot time interval of 4096 bits would yield a maximum network diameter of approximately 200 meters.

In prior 10 or 100 megabit Ethernet networks, a communication node that transmits a data packet having fewer bits than the 512 bit minimum slot time interval typically pads the data packet until the end of the minimum slot time interval. Such slot time padding in prior networks usually has a relatively small negative impact on network efficiency because the minimum slot time in such networks is a relatively short 512 bit times.

Unfortunately, an increase in minimum slot time to, for example, 4096 bit times causes a drastic reduction in network efficiency during transmission of relatively small data packets that are padded to meet the minimum slot time. In addition, the existing communication software for various computer related networks commonly perform polling and negotiation transactions over the network. Such transactions usually involve the transmission of relatively small data packets. For instance, 64 byte data packets are quite common for Ethernet communication networks.

Unfortunately, such relatively small data packets would occupy only ⅛ of a single minimum slot time for a gigabit Ethernet communication network having a minimum slot time interval for 4096 bit times. As a consequence, ⅞ of the capacity of such a high bandwidth network is wasted as individual communication nodes pad such 64 byte data packets to meet the minimum slot time specification. Such inefficiencies limit the overall throughput of such a network by wasting a significant portion of available bandwidth.

SUMMARY AND OBJECTS OF THE INVENTION

One object of the present invention is to improve the efficiency of high bandwidth communication networks that have a minimum data transmission time interval.

Another object of the present invention is to provide improved efficiency in high bandwidth Ethernet communication networks.

A further object of the present invention is to provide efficient throughput in a communication network without requiring changes to existing communications software.

These and other objects are provided by a method for efficient communication in a network having a minimum data transmission time interval wherein a data packet is transmitted beginning at a start of the minimum data transmission time interval. An end of the minimum data transmission time interval is determined and then at least one next data packet is transmitted after the data packet if the end of the minimum data transmission time is after the end of the data packet.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
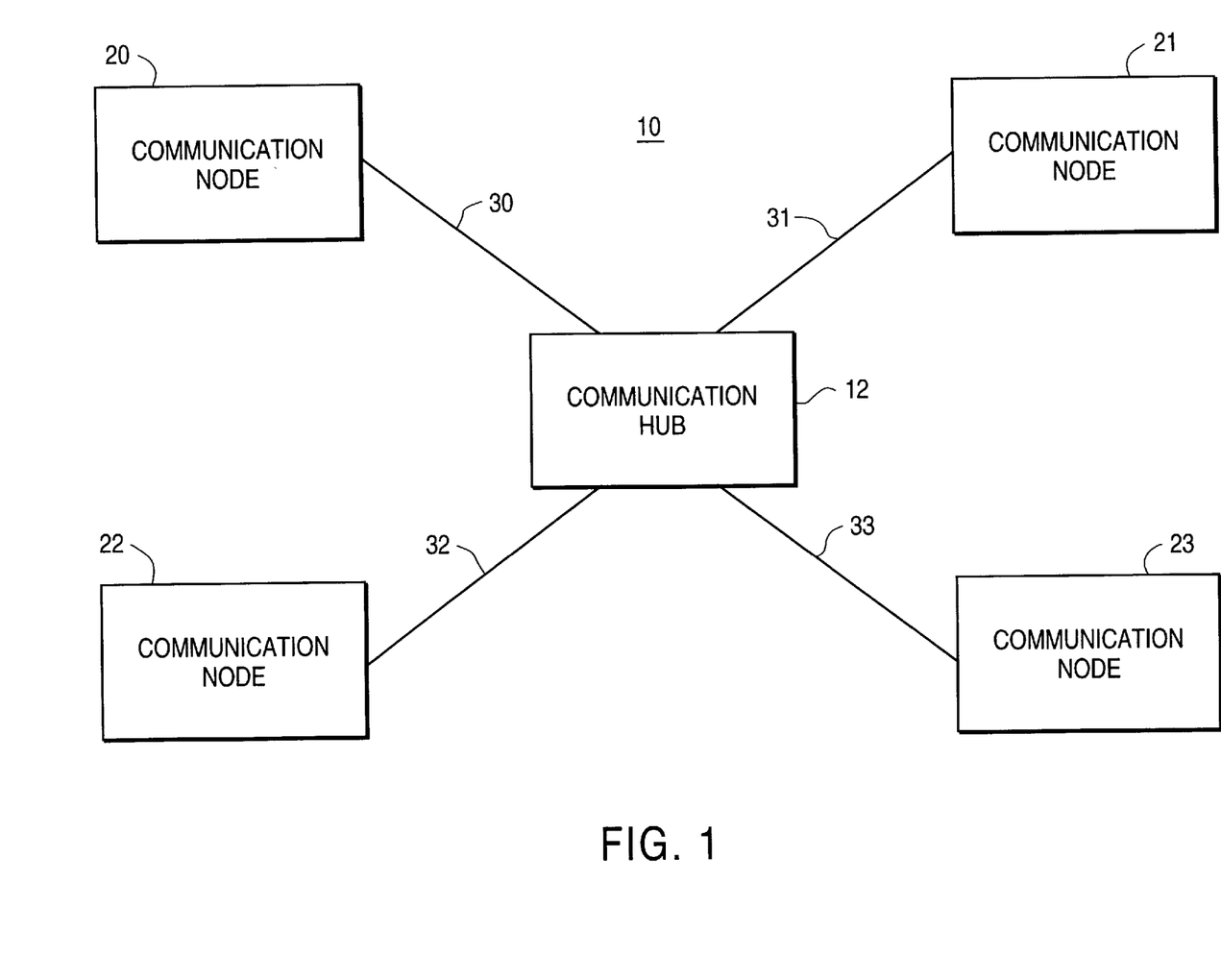
FIG. 1 illustrates a communication network having a protocol that enables data transmissions with collision detection and that imposes a minimum data transmission time interval.

FIG. 1 illustrates a communication network 10 having a protocol that enables data transmissions with collision detection and that imposes a minimum data transmission time interval. The communication network 10 includes a set of communication nodes 20–23. The communication node 22 performs multiple data packet transmissions during each minimum data transmission time interval as disclosed hereinafter while communication nodes 20, 21 and 23 pad small packets to meet the minimum data transmission time interval in accordance with prior systems.

In one embodiment, the communication network 10 is an Ethernet communication network that includes a communication hub 12. The communication hub 12 enables data transmission among the communication nodes 20–23 via a set of transmission lines 30–33. The communication links 30–33 each comprise a coaxial transmission line, a fiber optic transmission line, or a twisted pair transmission line. The transmission lines 30–33 carry data at a rate of 1 gigabit per second with a minimum slot time interval of 4096 bit times.

Figure 2:
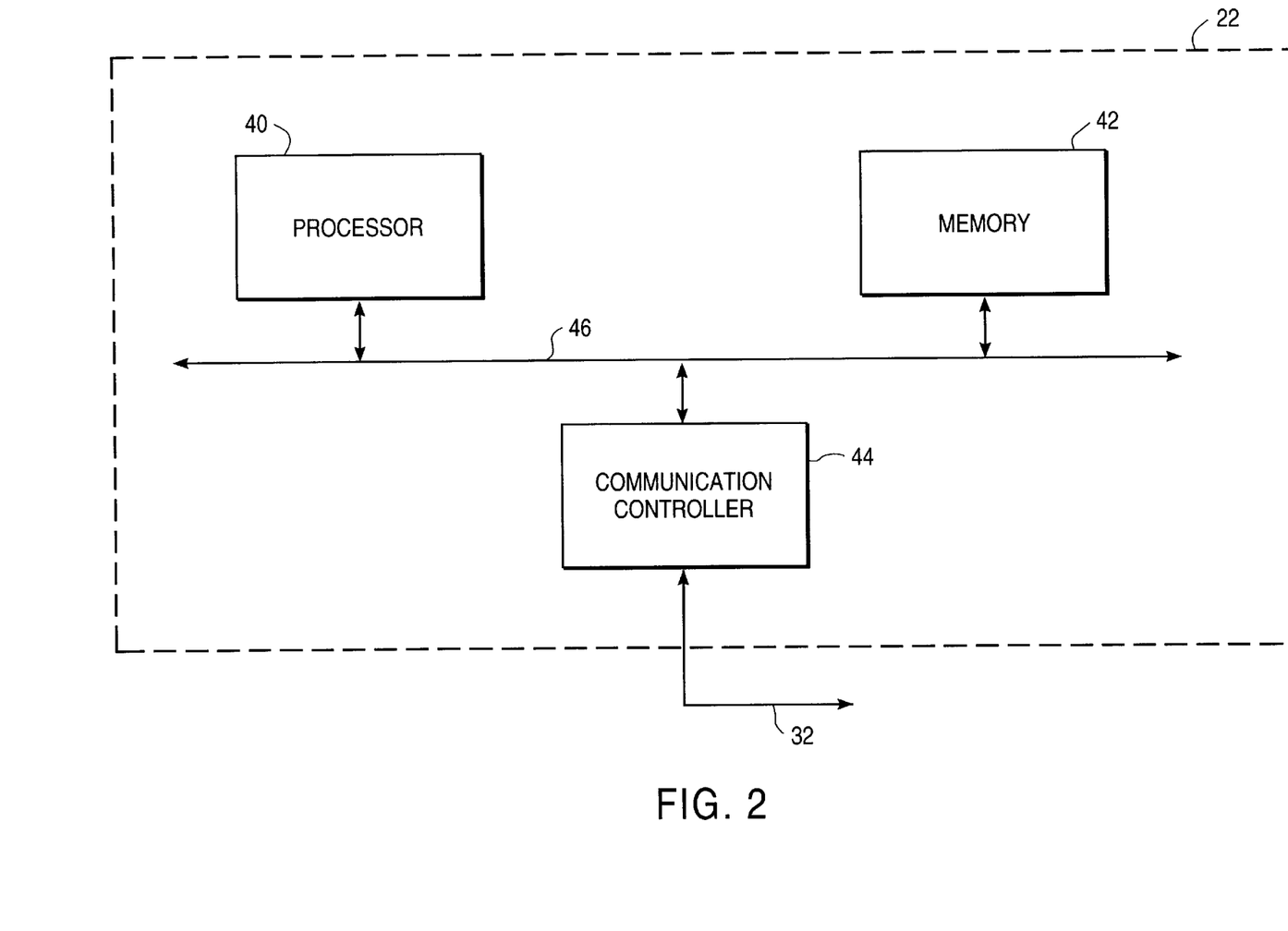
FIG. 2 illustrates a communication node including a communication controller having circuitry for tracking the minimum data transmission time interval on a communication link and circuitry for packing and unpacking multiple data packets during each minimum data transmission time interval.

FIG. 2 illustrates the communication node 22 in one embodiment. The communication node 22 includes a processor 40, a memory 42, and a communication controller 44. The communication controller 44 transmits and receives data packets via the communication link 32. The communication controller 44 includes circuitry for tracking the minimum data transmission time interval on the communication link 32 and circuitry for packing and unpacking multiple data packets during each minimum data transmission time interval.

The processor 40 communicates with the memory 42 and the communication controller 44 via an input/output bus 46. The processor 40 reads and writes data packets and commands to the communication controller 44 via the input/output bus 46.

Figure 3:
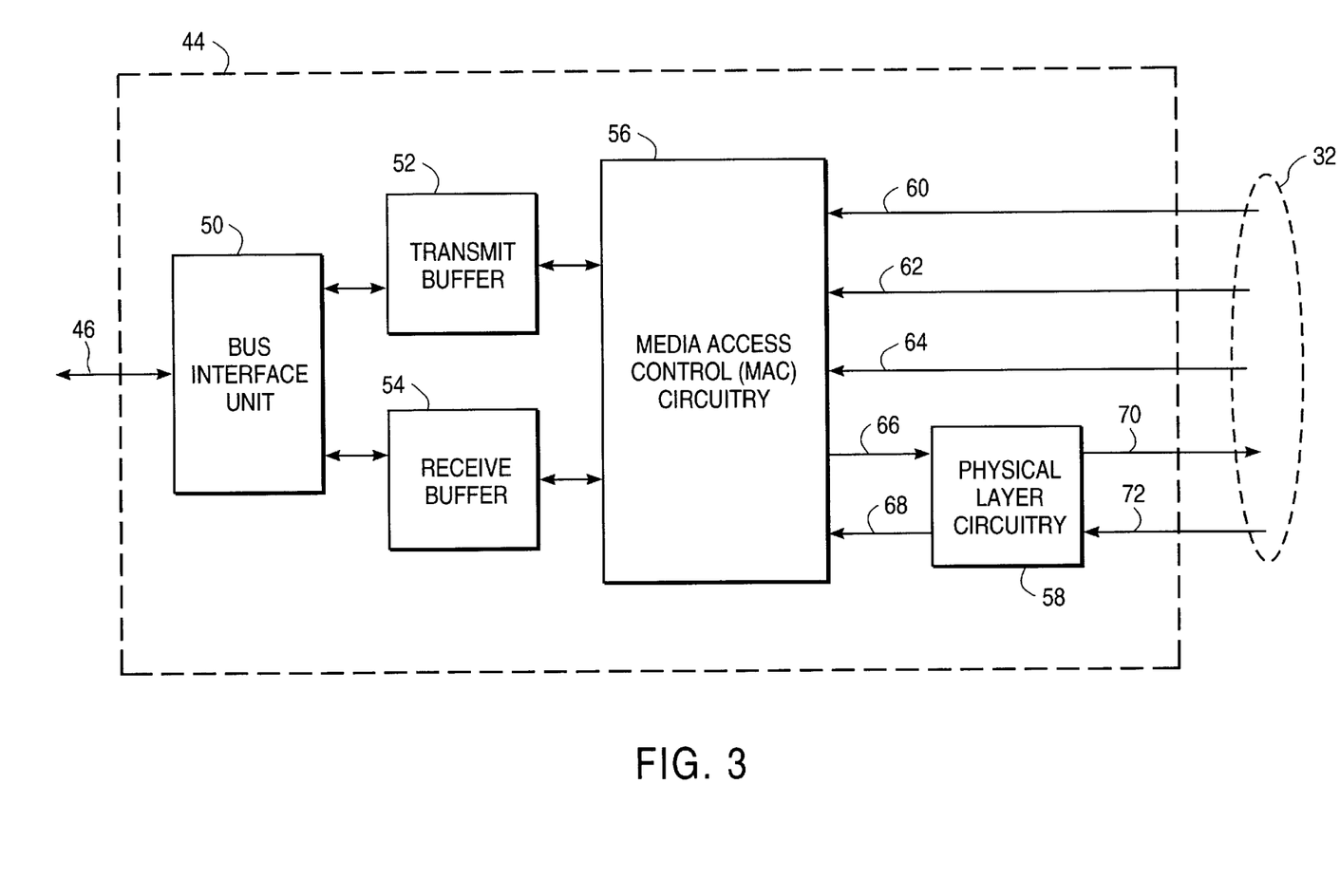
FIG. 3 illustrates the communication controller in one embodiment.

FIG. 3 illustrates the communication controller 44 in one embodiment. The communication controller 44 includes a bus interface unit 50, a transmit buffer 52, a receive buffer 54, a media access control (MAC) circuit 56, and a set of physical layer circuitry 58. In this embodiment, the transmit buffer 52 and the receive buffer 54 are each implemented as first in/first out (FIFO) buffers.

The processor 40 transfers outgoing data packets and commands into the transmit buffer 52 via the bus interface unit 50. In addition, the processor 40 reads incoming data packets from the receive buffer 54 via the bus interface unit 50.

The MAC circuitry 56 in one embodiment receives a byte stream of data for an outgoing data packet from the transmit buffer 52. In other embodiments, the MAC circuitry 56 receives the outgoing data packet from the transmit buffer 52 as a serial data stream or octet data stream. The MAC circuitry 56 generates a corresponding transmit data signal 66 containing the outgoing data packet. The physical layer circuitry 58 in turn drives the transmit data signal 66 over the communication link 32 as a transmit data signal 70.

In addition, the physical layer circuitry 58 receives a receive data signal 72 over the communication link 32 and generates a corresponding receive data signal 68. The MAC circuitry 56 assembles the receive data signal 68 into a byte stream for transfer into the receive buffer 54.

A carrier sense signal 60 to the MAC circuitry 56 indicates the occurrences of data transmissions on the communication link 32. A collision detect signal 62 to the MAC circuitry 56 indicates whether a collision occurs on the communication link 32. In addition, the MAC circuitry 56 receives a receive data valid circuit 64 that indicates the start of packet and end of packet boundaries data packets carried via the received data signal 72.

The MAC circuitry 56 has the capability to transmit multiple data packets over the communication link 32 during each minimum data transmission time interval on the communication link 32. The MAC circuitry 56 includes logic for tracking the length of each data transmission time interval and circuitry for determining whether additional data packets may be transferred during a particular data transmission time interval.

In one embodiment for gigabit Ethernet, the MAC circuitry 56 includes a counter that increments, or alternatively decrements, for each of the 4096 bit times for a minimum slot time interval. After transmission of a particular data packet, the MAC control circuitry 56 uses the slot time counter to determine whether additional data packets may be transferred prior to the end of the minimum 4096 bit slot time interval.

Figure 4A:
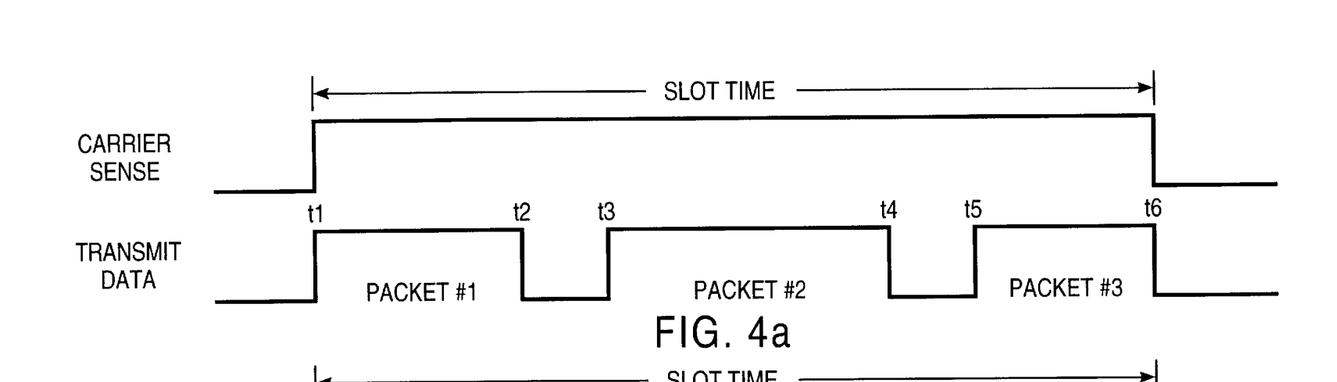
FIG. 4a illustrates a minimum data transmission time interval that includes multiple packet transmissions on a communication link.

FIG. 4a illustrates a slot time interval that includes multiple packet transmissions on the communication link 32 in one example. The slot time interval occurs between time t1 and t6 which in one embodiment equals 4096 of 1 nanosecond bit times. Between times t1 and t2, the MAC circuitry 56 drives packet #1 via the transmit data signal 66. The time interval between times t2 and t3 corresponds to the inter-packet gap interval specified by the Ethernet communication protocol. In one embodiment, the inter-packet gap (IPG) interval equals 96 bit times.

At time t3, the MAC circuitry 56 starts transmitting data packet #2 to the physical layer circuitry 58 via the transmit data signal 66. After an IPG interval between times t4 and t5, the MAC circuitry 56 transfers packet #3 via the transmit data signal 66. In this example, the end of packet #3 is reached at time t6 which corresponds to the end of the slot time interval. The total bits in packets #1 through #3 including preamble and cyclic redundancy codes (CRC) along with the two IPG time intervals equals 4096 bits.

Figure 4B:
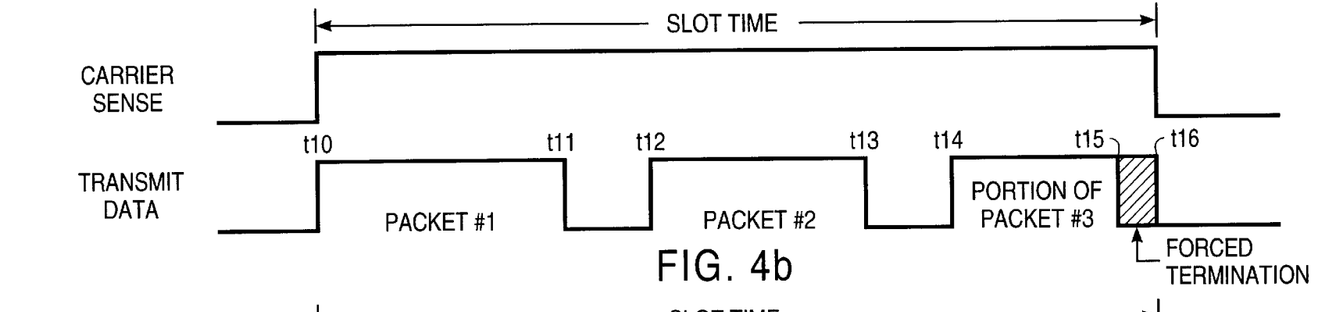
FIG. 4b illustrates a minimum data transmission time interval that includes multiple packet transmissions wherein a data packet extends past the end of the minimum data transmission interval.

FIG. 4b illustrates a slot time interval that includes multiple packet transmissions wherein a data packet extends past the end of the slot time interval. The slot time interval occurs between time t10 and t16. Between times t10 and t11, the MAC circuitry 56 drives packet #1 via the transmit data signal 66. After the IPG time interval between times t11 and t12, the MAC circuitry 56 starts transmitting data packet #2 and then another IPG interval occurs between times t13 and t14. At time t14, the MAC circuitry 56 starts transmitting packet #3 via the transmit data signal 66.

At time t15, the slot time counter in the MAC circuitry 56 indicates that the remainder of the slot time interval between time t15 and t16 will accommodate only a packet terminator. In one embodiment, the packet terminator is a cyclic redundancy code (CRC) having 4 bytes which normally terminates each of the packets #1, #2 and #3. The slot time counter at time t15 contains a count equal to 32 in an embodiment that employs a down counter for the slot time interval.

At time t15, the MAC circuitry 56 continues to receive data for packet #3 from the transmit buffer 52 which indicates that the data packet extends past the slot time taking into account the 32 bit CRC. In such a case, the MAC circuitry 56 forces the termination of packet #3 by generating an abnormal termination with a false error code. In one embodiment, the false error code is a false cyclic redundancy code (CRC) transmitted between times t15 and t16. The false CRC transmitted between times t15 and t16 causes later re-transmission of packet #3 in the same manner as if a collision detection had abnormally terminated packet #3.

Figure 4C:
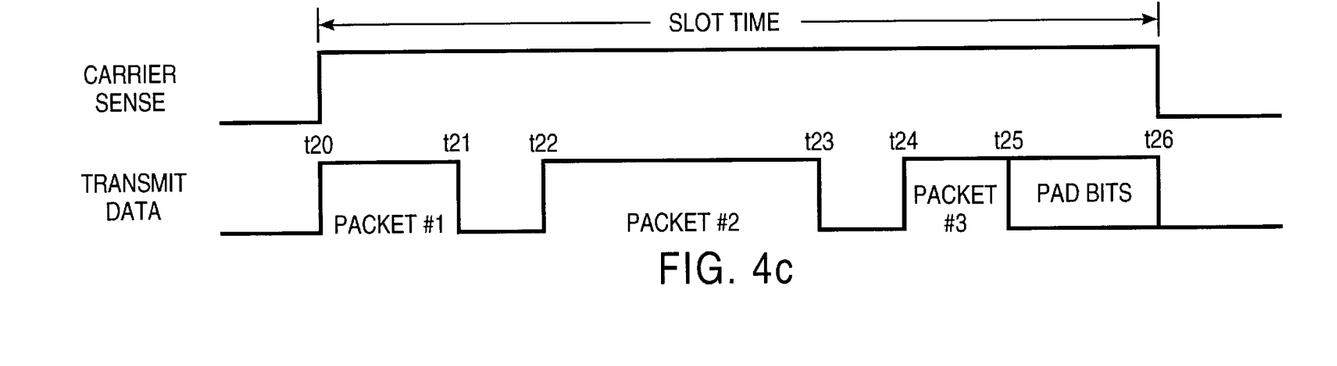
FIG. 4c illustrates a minimum data transmission time interval that includes multiple packet transmissions wherein a final data packet contains fewer data bits than is required for minimum data transmission interval.

FIG. 4c illustrates a slot time interval that includes multiple packet transmissions wherein a final data packet contains fewer data bits than is required to fill out the entire slot time interval. This example slot time interval occurs between time t20 and t26. Between times t20 and t21, the MAC circuitry 56 drives packet #1 via the transmit data signal 66 and then waits an IPG time interval between times t21 and t22. Between times t22 and t23, the MAC circuitry 56 transmits data packet #2 and then another IPG interval occurs between times t23 and t24.

Between times t24 and t25, the MAC circuitry 56 transmits packet #3 via the transmit data signal 66. At time t25, the slot time counter in the MAC circuitry 56 indicates that the slot time interval extends past time t25. In this case, the MAC circuitry 56 pads the remainder of the slot time interval between times t25 and t26.

Figure 5:
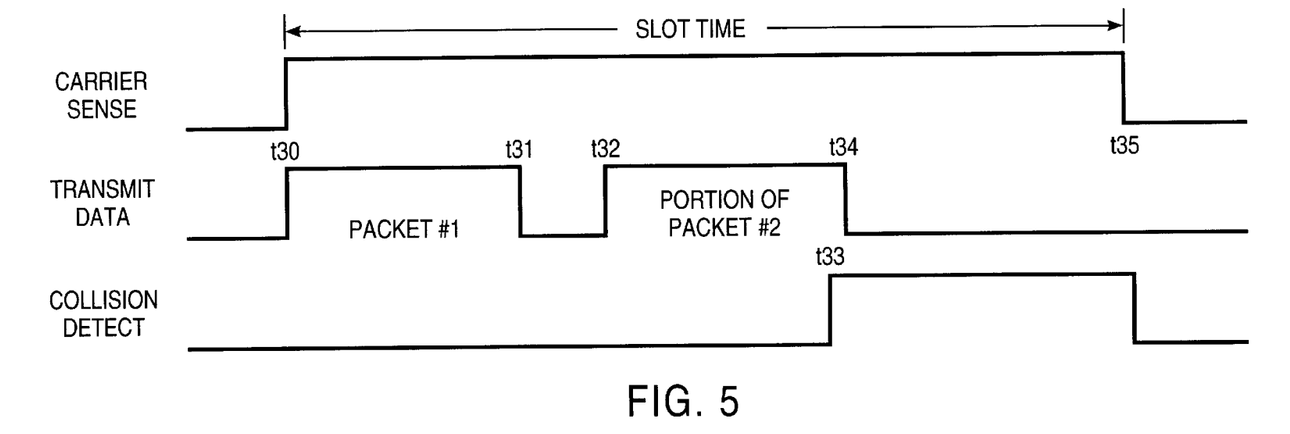
FIG. 5 illustrates a minimum data transmission time interval on a communication link that includes a collision.

FIG. 5 illustrates a slot time interval on the communication link 32 that includes a collision. This example slot time interval occurs between time t30 and t35. Between times t30 and t31, the MAC circuitry 56 drives packet #1 via the transmit data signal 66 and then waits an IPG time interval between times t31 and t32. Starting at time t32, the MAC circuitry 56 transmits packet #2 over the communication link 32.

At time t33, the MAC circuitry 56 senses the activated collision detect signal 62 which indicates a collision has occurred on the communication link 32. Thereafter, at time t34 the MAC circuitry 56 terminates packet #2 with an abnormal termination. The abnormal termination of packet #2 at time t34 causes a later re-transmission of packets #1 and #2 as well as any other data packets that can be transferred before the end the retransmitted slot time interval.

Figure 6:
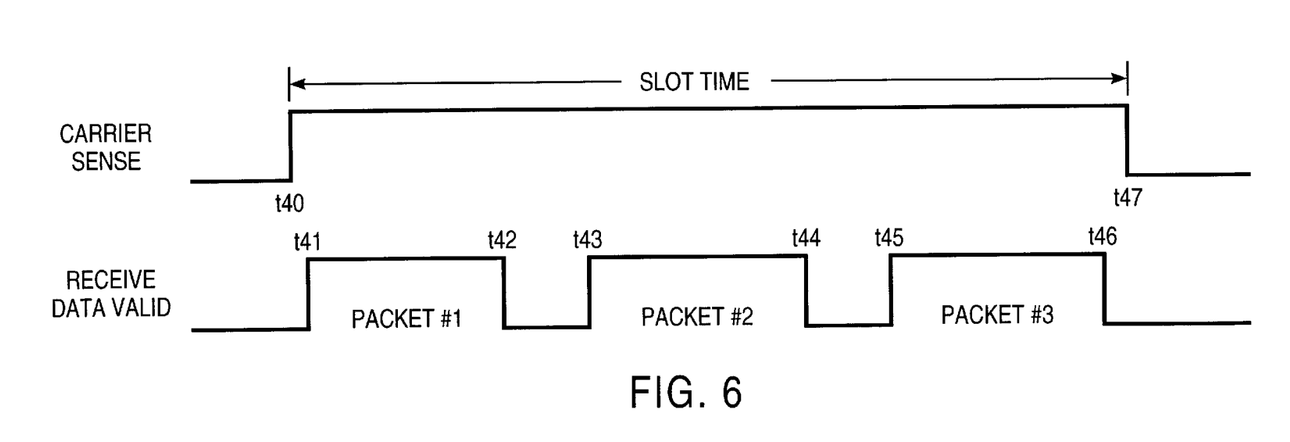
FIG. 6 illustrates a series of data packets received via a communication link during a single data transmission time interval.

FIG. 6 illustrates a series of data packets received via the communication link 32 during a single slot time interval. The receive data valid signal 64 indicates the start of packet and end of packet boundaries for packets #1 through #3 between times t41 and t46. The carrier sense signal 60 bounds the received data signal 64 at times t40 and t47.

The control algorithm employed by the MAC circuitry 56 to determine whether a slot time interval can accommodate multiple packets and for selecting an appropriate termination of a slot time interval is illustrated by the following pseudo code:

```
#define slottime 4096
#define minFrameSize 512
#define ipgtime 96
counter slotcounter; /* increments for each
transmitted bit (packet and ipg */
int len; /* len of current frame */
int total_packets;
        total_packets = 1;
begin:   transmit (len);
            if (minFrameSize < len < (slottime –
            minFrameSize)) then
                wait (ipgtime);
                total_packets = total_packets + 1;
                goto begin:
        and
expire:  if (slotcounter > (slottime – 4Bytes)) &
(total_packets > 1) then
                abort_transmit( );
                generate false_crc; /* or other
                    false error code */
            endif
collision:  if (CollisionDetect) then
                retransmit all packets
            endif
```

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for providing more efficient communication in a packet transmitting network having a plurality of packet transmitters and a predefined minimum data transmission time interval MDTTI, wherein each of the packet transmitters is expected by protocol to continue a transmission therefrom at least for the MDTTI, wherein each packet may be of variable length and is at least of a predefined minimum packet size, and wherein the MDTTI is greater than the minimum packet size, said method comprising the steps of:

(a) transmitting a first data packet within a first MDTTI of a first of said transmitters, said first MDTTI having a respective first length and an end, said first data packet being transmitted by the first transmitter, said first data packet having a corresponding first packet start and a first packet end;

(b) tracking the first packet and determining therefrom whether there is room between the first packet end and the end of the first MDTTI at least for another data packet of said minimum packet size; and (c) beginning a transmitting from the first transmitter and within the first MDTTI of a second data packet after the first data packet in response to said determining step indicating that said room exists.

2. The method of claim 1, further comprising the step of:

(d) forcing a premature termination of the transmission of the second data packet at the end of the first MDTTI if complete transmission of the second data packet will extend beyond the end of the first MDTTI.

3. The method of claim 2, wherein the step of forcing the premature termination includes the step of including a false error detection code within the transmission of the second data packet.

4. The method of claim 3, wherein the false error detection code comprises a false cyclic redundancy code for the second data packet.

5. The method of claim 1, wherein the step of beginning the transmitting from the first transmitter and within the first MDTTI of the second data packet after the first data packet includes the step of:

separating the first data packet and the second data packet by an interpacket gap IPG.

6. The method of claim 1, further comprising the steps of:

(d) determining if complete transmission of the second data packet in its original form will end before the end of the first MDTTI: and (e) padding the second data packet so as to extend the complete transmission of the second data packet until the end of the first MDTTI in response to the determining step indicating that the complete transmission of the second data packet in its original form ends before the end of the first MDTTI.

7. The method of claim 1, wherein said predefined MDTTI is at least 8 times said predefined minimum packet size.

8. The method of claim 7, wherein the MDTTI comprises at least 4096 bit times.

9. An apparatus for providing more efficient communication in a packet transmitting network having a plurality of packet transmitters and a predefined minimum data transmission time interval MDTTI, wherein each of the packet transmitters is expected by protocol to continue its transmission at least for the MDTTI, said apparatus comprising:

(a) means for transmitting a first data packet within a first MDTTI of a first of the transmitters, said first MDTTI having a length and an end, said first data packet being transmitted by the first transmitter, said first data packet having a size at least of a predefined minimum packet size and a respective first start and a first end encompassing the size of the first data packet;

(b) means for determining whether there is room between the first end of the first data packet and the end of the first MDTTI at least for another data packet of said minimum packet size; and (c) means for beginning a transmitting from the first transmitter and within the first MDTTI of a second data packet having at least the predefined minimum packet size after the first data packet in response to said determining means indicating that said room exists.

10. The apparatus of claim 9, further comprising:

(d) means for forcing a premature termination of transmission of the second data packet at the end of the first MDTTI if complete transmission of the second data packet will extend beyond the end of the first MDTTI.

11. The apparatus of claim 10, wherein the means for forcing the premature termination includes means for transmitting a false error detection code within the second data packet.

12. The apparatus of claim 11, wherein the false error detection code comprises a false cyclic redundancy code for the second data packet.

13. The apparatus of claim 9, wherein the means for beginning the transmitting from the first data transmitter and within the first MDTTI of the second data packet after the first data packet includes means for separating the first data packet and the second data packet by an interpacket gap IPG.

14. The apparatus of claim 9, further comprising:

(d) means for determining if the second data packet in its original form will end before the end of the first MDTTI; and (e) means for padding the second data packet until the end of the first MDTTI in response to a determination by the determining means that the second data packet in its original form ends before the end of the first MDTTI.

15. The apparatus of claim 9, wherein the packet transmitting network comprises a gigabit Ethernet local area network.

16. The apparatus of claim 15, wherein the first MDTTI comprises at least 4096 bit times on the gigabit Ethernet local area network.

17. The method of claim 13, wherein the IPG comprises at least 96 bit times.

18. The method of claim 1, wherein the second data packet has a size different from the size of the first data packet, and a second start and a second end encompassing the size of the second data packet, further comprising the step of determining whether there is second room between the second end of the second data packet and the end of the first MDTTI.

19. The method of claim 18, further comprising the step of beginning a transmitting from the first data transmitter and within the first MDTTI of a third data packet after the second data packet in response to said determining step indicating that said second room exists.

20. The method of claim 19, further comprising the step of forcing a premature termination of the third data packet by transmitting a false error detection code for the third data packet if complete transmission of the third data packet will extend beyond the end of the first MDTTI.

21. The method of claim 1, wherein the first and second data packets each include a destination address for directing each of the data packets to a respective destination.

22. The method of claim 1, wherein the first data packet comprises at least 512 bit times.

23. A method for efficient communication in a network, comprising the steps of:

(a) transmitting a first data packet within a minimum data transmission time interval MDTTI having a predefined end;

(b) determining an end of the first data packet;

(c) transmitting a second data packet within the MDTTI after the first data packet if the end of the first data packet is before the end of the MDTTI, the first and second data packets each including a respective destination address for directing each of the data packets to a respective destination; and (d) separating the first data packet and the second data packet by an interpacket gap IPG.

24. The method of claim 23, further comprising the step of forcing a premature termination of the second data packet at the end of the MDTTI if complete transmission of the second data packet will extend beyond the end of the MDTTI.

25. The method of claim 24, wherein the step of forcing the premature termination includes the step of including a false error detection code within the transmission of the second data packet.

26. The method of claim 25, wherein the false error detection code comprises a false cyclic redundancy code for the second data packet.

27. The method of claim 23, further comprising the steps of:

(e) determining if complete transmission of the second data packet in its original form will end before the end of the MDTTI; and (f) padding the second data packet until the end of the MDTTI in response to the determining step indicating that the second data packet in its original form ends before the end of the MDTTI.

28. The method of claim 23, wherein the network comprises a gigabit Ethernet local area network.

29. The method of claim 28, wherein the MDTTI comprises at least 4096 bit times on the gigabit Ethernet local area network.

30. The method of claim 23, wherein the IPG comprises at least 96 bit times.

31. The method of claim 23, wherein the first data packet comprises a first plurality of bit times, and wherein the step of determining the end of the first data packet includes the step of tracking the number of bit times in the first data packet.

32. The method of claim 31, wherein the second data packet comprises a second plurality of bit times, further comprising the step of tracking the number of bit times in the second data packet.

33. The method of claim 32, further comprising the step of forcing a premature termination of the second data packet by transmitting a false error detection code within the second data packet if complete transmission of the second data packet will extend beyond the end of the MDTTI.

34. The method of claim 32, further comprising the step of padding the second data packet until the end of the MDTTI if the transmission of the second data packet in its original form ends before the end of the MDTTI.

35. An apparatus for efficient communication, comprising:

(a) first means for transmitting a first data packet within a first minimum data transmission time interval MDTTI having a predefined interval length and an end, the first data packet having at least a minimum packet length;

(b) a counter, coupled to the first means, capable of keeping track of how many bit times of the first MDTTI have already been transmitted;

(c) means, coupled to the counter, for transmitting a second data packet after the first data packet if the number of bit times of the first MDTTI already transmitted is less than the interval length, the first and second data packets each including a respective destination address for directing each of the data packets to a respective destination; and (d) means for separating the first data packet and the second data packet by an interpacket gap IPG.

36. The apparatus of claim 35, further comprising means for forcing a premature termination of the second data packet at the end of the first MDTTI if complete transmission of the second data packet will extend beyond the end of the first MDTTI.

37. The apparatus of claim 36, wherein the means for forcing the premature termination includes means for transmitting a false error detection code within the second data packet.

38. The apparatus of claim 37, wherein the false error detection code comprises a false cyclic redundancy code for the second data packet.

39. The apparatus of claim 35, further comprising means for padding the second data packet until the end of the first MDTTI if transmission of the second data packet in its original form ends before the end of the first MDTTI.

40. The apparatus of claim 35, wherein the first and second means are capable of transmitting the respective first and second data packets in a gigabit Ethernet format.

41. The apparatus of claim 40, wherein the first MDTTI comprises at least 4096 bit times.

42. The method of claim 35, wherein the IPG comprises at least 96 bit times.

43. The apparatus of claim 35, wherein the first and second data packets each comprise at least 512 bit times.

44. For a packet transmitting system having a plurality of transmitters and allowing for collisions between a plurality of data packets, wherein each of the packets includes at least a destination field and has at least a predefined minimum packet length, the system characterized by a protocol that expects each transmitter to continue its transmission at least for a predefined minimum data transmission time interval MDTTI, a multipacket transmitting method comprising the steps of:

(a) beginning transmission by a first of said transmitters of at least a first packet within a corresponding first MDTTI, the first packet having a respective first packet end and the first MDTTI having a respective first interval end;

(b) first determining if there is room between said first packet end and said first interval end for inclusion within the first MDTTI of at least a hypothetical packet having the minimum packet length; and (c) in response to a determination by said first determining step that there is room for at least the hypothetical packet of the minimum packet length, and after the transmission of the first packet ends, beginning a transmission by said first transmitter of a second packet within the first MDTTI, the second packet having a respective second packet end.

45. The method of claim 44, further comprising the step of determining if complete transmission of the second packet will extend beyond the first interval end.

46. The method of claim 45, further comprising the step of forcing a premature termination of the transmission of the second packet at the first interval end in response to a determination by the step of determining that the complete transmission of the second packet will extend beyond the first interval end.

47. The method of claim 44, further comprising the step of, in response to a determination by said first determining step that there is insufficient room for at least the hypothetical packet of the minimum packet length, and after the transmission of the first packet in its original form ends, padding the first packet until the first interval end.

48. The method of claim 44, wherein the step of first determining if there is room between said first packet end and said first interval end further comprises the step of second determining if there is room between said first packet end and said first interval end for inclusion within the first MDTTI of an interpacket gap IPG and the hypothetical packet of the minimum packet length, the interpacket gap IPG having a predefined IPG length and an IPG end.

49. The method of claim 48, wherein the step of beginning the transmission by said first transmitter of the second packet further comprises the step of beginning the transmission of the second packet after the IPG end in response to a determination by the second determining step that there is room between said first packet end and said first interval end for inclusion within the first MDTTI of the IPG and the hypothetical packet of the minimum packet length.

50. The method of claim 49, further comprising the step of forcing a premature termination of the second packet if complete transmission of the second packet will extend beyond the first interval end.

51. The method of claim 48, wherein the step of second determining if there is room between said first packet end and said first interval end further includes the step of tracking the IPG length.

52. The method of claim 44, wherein the step of first determining if there is room between said first packet end and said first interval end further includes the step of tracking the length of the first packet.

53. A networked system having a plurality of packet transmitters and allowing for collisions between a plurality of data packets, where each of the packets includes at least a destination field and has at least a predefined minimum packet length, the system characterized by a protocol that expects each of the packet transmitters to continue its transmission at least for a predefined minimum data transmission time interval MDTTI, said system including at least one multipacket transmitting node comprising:

(a) first means for beginning transmission of at least a first packet within a corresponding first MDTTI of the multipacket transmitting node, the first packet having a respective first packet end, and the first MDTTI having a respective first interval end;

(b) second means for determining if there is room between said first packet end and said first interval end for inclusion within the first MDTTI of at least a hypothetical packet having the minimum packet length; and (c) third means, responsive to a determination by said first determining means that there is room for at least the hypothetical packet of the minimum packet length, and after transmission of the first packet ends, for initiating transmission by said first node of a second packet within the first MDTTI, the second packet having a respective second packet end.

54. The apparatus of claim 53, further comprising fourth means for determining if complete transmission of the second packet will extend beyond the first interval end.

55. The apparatus of claim 54, further comprising means for forcing a premature termination of the transmission of the second packet at the first interval end in response to a determination by said fourth means that the complete transmission of the second packet will extend beyond the first interval end.

56. The apparatus of claim 53, further comprising means for padding the first packet until the first interval end in response to a determination by said second means that there is insufficient room for at least the hypothetical packet of the minimum packet length.

57. The apparatus of claim 53, wherein the second means for determining if there is room between said first packet end and said first interval end further comprises fourth means for determining if there is room between said first packet end and said first interval end for inclusion within the first MDTTI of an interpacket gap IPG and the hypothetical packet of the minimum packet length, the IPG having a predefined IPG length and an IPG end.

58. The apparatus of claim 57, wherein the third means further comprises fifth means for beginning the transmission of the second packet after the IPG end in response to a determination by the fourth means that there is room between said first packet end and said first interval end for inclusion within the first MDTTI of the IPG and the hypothetical packet of the minimum packet length.

59. The apparatus of claim 58, further comprising means for forcing a premature termination of the second packet if complete transmission of the second packet will extend beyond the end of the first MDTTI.

60. The apparatus of claim 57, wherein the fourth means for determining if there is room between said first packet end and said first interval end further includes means for tracking the IPG length.

61. The apparatus of claim 53, wherein the second means for determining if there is room between said first packet end and said first interval end further includes means for tracking the length of the first packet.

* * * * *